No. 714,769. Patented Dec. 2, 1902.
C., B. & W. ZABEL.
CARBON HOLDER FOR DYNAMO ELECTRIC MACHINES.
(Application filed Oct. 28, 1901.)
(No Model.)
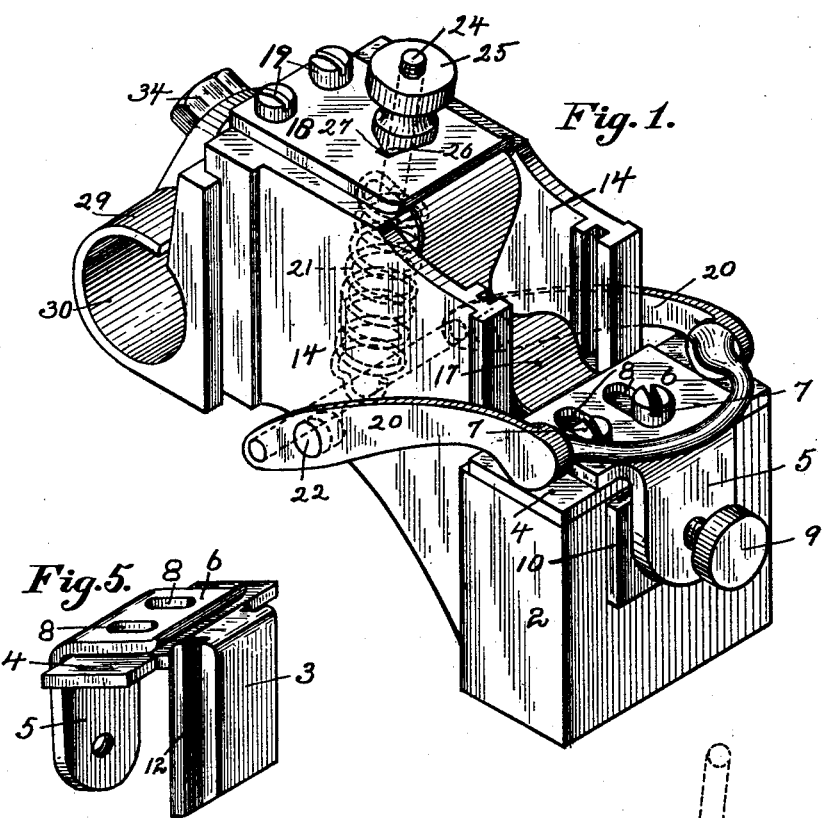
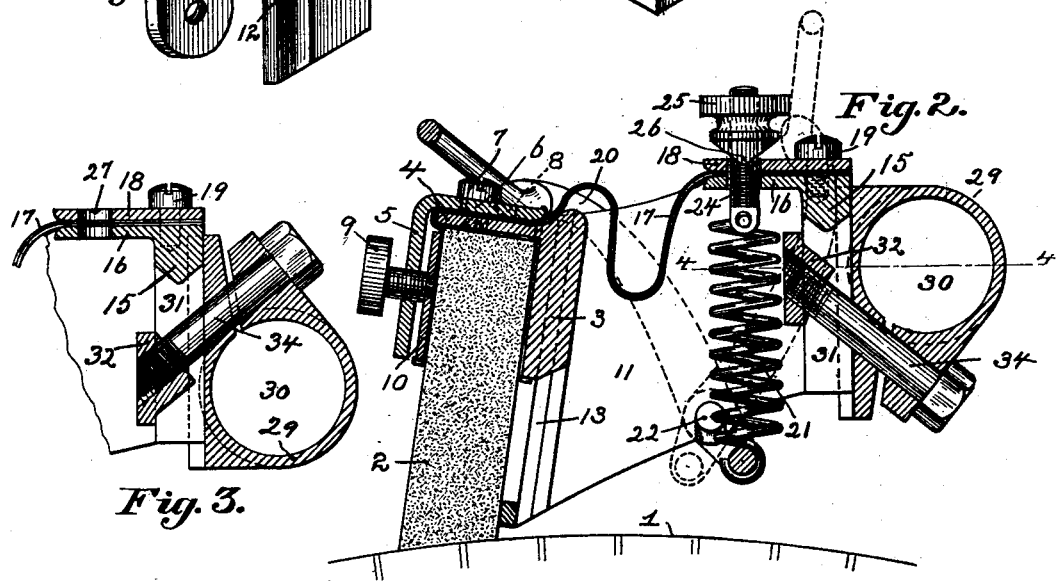
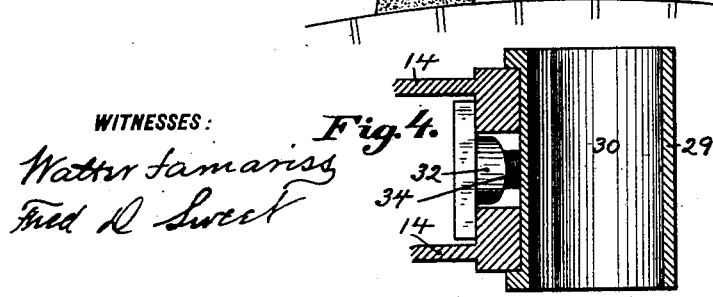
WITNESSES:
Walter Tamarisk
Fred D. Sweet
INVENTORS
Charles Zabel
Bruno Zabel
William Zabel
BY Kay & Totten
ATTORNEYS

UNITED STATES PATENT OFFICE.

CHARLES ZABEL, BRUNO ZABEL, AND WILLIAM ZABEL, OF EDGEWOOD PARK, PENNSYLVANIA.

CARBON-HOLDER FOR DYNAMO-ELECTRIC MACHINES.

SPECIFICATION forming part of Letters Patent No. 714,769, dated December 2, 1902.

Application filed October 28, 1901. Serial No. 80,231. (No model.)

*To all whom it may concern:*

Be it known that we, CHARLES ZABEL, BRUNO ZABEL, and WILLIAM ZABEL, residents of Edgewood Park, in the county of Allegheny and State of Pennsylvania, have invented a new and useful Improvement in Carbon-Holders for Dynamo-Electric Machines; and we do hereby declare the following to be a full, clear, and exact description thereof.

Our invention relates to carbon or brush holders for dynamo-electric machines and the like; and one of its objects is to provide a carbon-holder for this purpose which will accommodate carbons of various sizes, which will permit the carbons to be set close together, thus permitting the commutator to be shortened, and which clamps the carbon so that it is largely exposed to the free air, thereby permitting the radiation of the heat.

Another object of our invention is to provide a carbon-holder having a flexible laminated shunt-conductor in direct contact with the carbon and preferably in contact with several sides or faces thereof, thereby giving a good contact and insuring the carrying off of all the current from the brush.

Another object of our invention is to provide a spring-pressure device for pressing the carbon against the commutator, which will give a uniform pressure without adjustment at all stages of the wear of the carbon and which is so constructed that it can be thrown out of the way to permit removal and inspection of the carbon and can again be thrown into action, giving the same pressure as before without the necessity of readjustment.

Another object of our invention is to provide a support for a short carbon-holder which will insure the holding of the carbon in substantially the same radial position with reference to the commutator as the latter wears or is turned down.

A further object of our invention is to improve carbon or brush holders in details of construction, as will hereinafter appear.

All carbon-holders for long flat commercial carbons as at present constructed which provide for a sliding motion of the carbon toward the commutator as the carbon wears away are provided with a box in which the carbon slides, a slight clearance between the carbon and box being allowed. In this device any slight variation in the width or thickness of the carbon, as is common in commercial carbons, is a source of considerable trouble, for if the carbon is too small the clearance between the same and the box will be so large that the carbon will vibrate when the machine is running, thus rendering the carbon useless, and if the carbon is too large it has to be filed down to the proper dimensions, in which event a poor contact with the carbon-box is liable to result. Furthermore, these carbon-boxes expose only a little of the carbon to the air, so that the radiating-surface is very small, and as a consequence the carbons and adjoining parts will heat, thus lessening the capacity of the carbon for carrying current. Furthermore, the sides of the carbon-boxes take up a considerable amount of space, so that when a number of carbon-holders are set side by side, as in large machines, the commutator must be longer than it would need to be were the sides of the boxes removed.

One object of our invention is to provide a carbon-holder for dynamo-electric machines in which all of the above defects and inconveniences are avoided, and to this end it comprises a clip for clamping the end of the carbon, said clip being so constructed that it will clamp the carbon on its inner and outer surfaces, but not on its side edges, and said clip also being made adjustable, so as to accommodate carbons of various thicknesses. Inasmuch as the side edges of the carbons are not embraced by the clip, variations in width of the carbon are not detrimental. Furthermore, a large part of the surface of the carbon is exposed to the air, thus allowing for the radiation of heat and insuring a large current-carrying capacity in the carbon. Furthermore, when a number of these carbons are set side by side they can be placed much closer together than with the old form of carbon-holders, so that the commutator can be correspondingly shortened, thus resulting in a considerable saving of copper and in the space occupied. This carbon-clip also reduces the number of different carbon-holders necessary for a series or line of machines from about thirty, as now used, to about two or three. These clips also permit the carbon being set somewhat to one side, so that the positive and negative carbons can be relatively staggered, and thus preventing wearing ridges on the commutator.

In all carbon-holders now in use the flexible shunt-conductor is soldered or secured to a clip on the carbon and the current flows from the carbon through the clip to the shunt-conductor. This results in a more or less imperfect contact and conducting element. Another object of our invention is to overcome this defect, and to this end it comprises a flexible laminated shunt-conductor, preferably of copper, which is brought into direct contact with the carbon and preferably on two or more faces of the carbon, such as the front, top, and rear sides thereof. The flexible shunt-conductor preferably enters the clip and the laminæ are then separated and brought into contact with the various faces of the carbon, thus insuring a direct broad contact between the carbon and the shunt-conductor, which is sufficient in all cases to carry off the whole current from the carbon to the nearest collecting part.

All carbon-holders at present in use have some forms of spring mechanism for directly or indirectly pressing the carbon against the commutator, and as the carbon wears away these springs extend or contract more and more, thus decreasing in strength and pressing the carbon less firmly against the commutator. As a consequence, it is necessary to readjust the spring from time to time as the carbon wears down. Furthermore, if it is desired to take out the carbon from the carbon-holder for inspection, repair, or other cause the pressure mechanism in some forms of carbon-holders must be removed, and in other forms the spring is unduly contracted or extended, and in all forms the pressure mechanism must be readjusted when put back in place.

Another object of our invention is to provide spring-pressure mechanism for carbon-holders in which the above defects and disadvantages are overcome, and to this end it comprises a sliding carbon clip or box and a lever-and-spring mechanism for forcing the same toward the commutator, the arrangement being such that the pressure of the spring is always uniform without the necessity of adjustment no matter to what extent the carbon may be worn. This spring-and-lever mechanism, furthermore, is so arranged that it can be thrown out of the way to permit the removal of the carbon and carbon-clip for inspection, repair, or other purposes, after which it can be thrown into action to exert the same pressure that it did before without the necessity of readjustment. This result is secured by providing a pivoted lever so arranged that its long arm has a sliding connection with the carbon-clip and having a spring connected to its short arm and pulling substantially in a line parallel to the line of movement of the carbon, so that as the lever swings about its pivot and the spring decreases in tension the short arm of the lever increases in effective length, thereby compensating for the loss of the tension of the spring. The lever, furthermore, is so pivoted with reference to the spring that when thrown back out of place the spring passes the center of the lever, thus holding the lever in an inoperative position.

Most carbon-holders in use at the present time are supported side by side on a rod or stud, and as the commutator wears away or is turned down the holder swings on a radius about said rod or stud. If the holder is sufficiently long to form a long radius, the change in the angle of the center line of the carbon with reference to the radial line of the commutator as the latter wears or is turned down is very small and may be neglected. Such carbon-holders, therefore, do not need any radial adjustment; but they have the disadvantage of covering a large part of the commutator circumference, thus limiting the number of poles that may be provided for a machine. For this reason it is preferable to have a short carbon-holder; but in that case as the commutator wears or is turned down the short radius of the holder causes such a variation of the center line of the carbon from the radial line of the commutator that radial adjustment is necessary.

A further object of our invention is to provide simple means for securing this radial adjustment. To this end the clip or bracket which is secured to the stud or rod is provided with a short plain contact-surface meeting a similar contact-surface on the carbon-holder, and the said parts are secured together by means which permit the reversal of the clip or bracket with reference to the carbon-holder, this means being preferably a bolt and nut which pass through the clip or bracket and have their inner ends secured to the support at a point substantially in line with a radial line drawn through the opening in the clip or bracket and perpendicular to the contact-faces of said clip and said holder.

In the accompanying drawings, Figure 1 is a perspective view of our improved carbon-holder. Fig. 2 is a longitudinal vertical section through the same. Fig. 3 is a detail of a similar view showing the supporting clip or bracket in the reverse position from that shown in Fig. 2. Fig. 4 is a horizontal section on the line 4 4, Fig. 2; and Fig. 5 is a perspective view of the carbon-clip.

In the drawings, 1 represents in outline a portion of the surface of a commutator, and 2 represents the carbon or brush bearing upon the same. In our improved holder the upper end of this carbon is held by a clip which in its specific embodiment comprises the member 3, adapted to bear against the inner or front face of the carbon and having the right-angled portion 4, which bears against the upper end of the carbon. The other member of the clip has the arm 5, which bears on the outer face of the carbon, and to accommodate carbons of different thicknesses the said member is provided with a right-angled portion 6, which is secured to the member 3 in any convenient manner which will permit adjustment of the parts—a convenient means for this purpose being the screws 7 and the slots 8, as shown, the screws being secured to one of said members and the slots formed in the other. To clamp the carbon in this clip, we preferably use the thumb or set screw 9, and this preferably bears against a clamping-plate 10, so as to give a broad contact with the carbon. The clip has a sliding connection with the support 11, and, as shown, the member 3 is provided with grooves 12 and the support 11 with corresponding tongues 13. Any other convenient arrangement for this purpose may, however, be employed.

The support 11 is provided with side webs 14 and bottom contact-piece 15 and with a small front plate 16. The shunt-conductor is shown at 17 and is composed of flexible strips, preferably of copper, the outer ends of which are clamped to the plate 16 by means of the plate 18 and screw 19, while the inner ends are brought into the carbon-clip and into direct contact with the carbon 2. As shown, the laminated flexible conductor extends into the clip between the members 4 and 6, and the laminæ are then separated, some being laid in contact with the outer face of the carbon between the same and the clamping-plate 10, while others are laid between the upper end of the carbon and the member 4 and thence along the inner face of the carbon between the same and the member 3. Thus the flexible conductor has direct contact by broad surfaces with three of the faces of the carbon, thereby insuring a sufficient contact to carry off all the current.

The carbon is pressed toward the commutator by suitable spring-and-lever mechanism, such as the lever 20 and spiral spring 21. The lever is preferably a double lever, as shown, having two members pivoted to the support at 22 below the upper end of the carbon, said members having their long arms extending upwardly and bearing slidably on the end of the carbon-clip at two points near the outer edges of said clip. As a consequence the clip and carbon will be forced forward in a substantially parallel line and cannot bind or become askew. The spring 21 is normally under tension and has one of its ends connected to the short arm of the lever 20 and has its axis substantially parallel to the line of movement of the carbon 2. As a consequence when the carbon wears away the spring will swing the lever 20 about its pivot 22; but this, as will be observed, will increase the effective length of the short arm of said lever, thereby compensating for the decreasing tension of the spring. As a consequence the carbon will always be held against the commutator with a uniform pressure and without the necessity of adjusting the tension of the spring as the carbon wears down. Various other arrangements of spring and lever which accomplish the same result might be used. If it is desired to remove the carbon-holder for inspection or other purposes, the lever 20 can be thrown back to the position shown in dotted lines in Fig. 2, in which position the spring will have passed the pivot 22 of the lever and will then act to hold the lever in its inoperative position, so that the carbon-holder can be slipped out, inspected or repaired, and again replaced without hindrance from the spring-and-lever mechanism. When again thrown into place, the spring and lever will act as before and with the same pressure without the necessity of readjustment.

The tension of the spring can be adjusted to suit different machines by means of the screw-rod 24, secured to the upper end of said spring and extending out through openings in the plates 16 and 18. A suitable knurled nut 25 working on the outer end of said rod effects the adjustment of the spring. This nut is shown as provided with the beveled or projecting inner faces 26, and adjacent to the opening in the plate 18 are slight depressions or notches 27, in which the edges or projections on the nut rest when in proper position. By these means the nut is prevented from ready rotation, so that it cannot work loose by the jarring of the machine.

The carbon-holder is supported on a suitable rod or stud, as is common, and for this purpose it is provided with a clip or bracket 29, having the opening 30, which passes over the rod or stud. As the commutator wears away or is turned down the holder must swing radially about this rod or stud, and with a short carbon-holder, such as shown, this will cause a considerable variation between the center line of the carbon and the radial line of the commutator, which variation must be compensated for. To accomplish this, we form the clip or bracket 29 so that it can be reversed with reference to the carbon-holder, the reverse positions being shown in Figs. 2 and 3. When the commutator is new and large, the clip or bracket will be in the position shown in Fig. 3, thus holding the support 11 at its greatest distance out or away from the commutator center, and after the commutator has worn or been turned down to a considerable extent the clip or bracket 29 is slipped off and put on in the position shown in Fig. 2, which permits the support 11 to approach closer to the commutator center. To permit of the quick and easy reversal of the clip or bracket 29, we have provided the base 15 of the holder 11 with an undercut slot 31, which is adapted to receive the flanged nut 32 on the inner end of the bolt 34. By loosening this bolt 34 the clip 29, with the flanged nut, can be slipped out of the support 11 and can then be reversed and again slipped into place, as shown. We preferably form the nut 32 and bolt 34 inclined, as shown, so that the nut will lie substantially in a line drawn perpendicular to the meeting faces of the holder and clip and radial to the socket 30. This secures the clip to the holder substantially at the center or middle line of said parts, thereby more firmly securing them together. The clip or bracket 29 is preferably split to clamp it to the rod or stud, and the bolt 34 can be used not only for securing the clip to the holder, but also for clamping the clip to the supporting rod or stud. In this way a single bolt can be made to perform both functions.

It will be observed that the carbon-clip shown embraces the carbon on its inner and outer surfaces only, leaving the side edges exposed, and as a consequence the carbons can be set close together, thereby shortening the commutator and the space occupied, and, furthermore, a large part of the surface of the carbon is exposed to the air, thereby permitting radiation of the heat and insuring the full carrying capacity of the carbon. There being no side walls to the clip a difference in the widths of the carbons has no effect, and the clip by reason of the screw-and-slot adjustment shown can be readily adapted to carbons of different thicknesses. In this way commercial carbons can be conveniently used without loss and trouble. The flexible shunt-conductor being made of laminated flat strips has a large contacting surface directly with the carbon, thus insuring the conducting away of all of the current from the carbon. The spring-pressure mechanism is so constructed that the pressure on the carbon is uniform at all times without necessitating the readjustment of the spring as the carbon wears down and is furthermore so constructed that it can be thrown out of the way to permit removal of the carbon-holder for inspection or repair and can then be thrown into position and without liability of unduly extending or compressing the spring or necessitating the removal of the same or readjustment thereof after being returned to place. The carbon-holder is provided with the reversible supporting clip or bracket 29 for radially adjusting the carbon with reference to the commutator, thus permitting the use of a short carbon-holder with all the advantages of the latter.

We wish it understood that our invention is not limited to the details of construction shown; but it can be varied within wide limits to embody the spirit of our invention.

What we claim as our invention, and desire to secure by Letters Patent, is—

1. In a carbon-holder for dynamo-electric machines and the like, a clip for clamping the end of the carbon, said clip comprising two substantially parallel arms or members arranged to receive the end of an ordinary flat commercial carbon between them and adapted to bear on the inner and outer faces thereof and leaving the side edges thereof exposed, and a suitable uniting member for said arms located at one of the ends of said arms.

2. In a carbon-holder for dynamo-electric machines and the like, a clip for clamping the end of the carbon, said clip comprising two substantially parallel arms or members arranged to receive the end of an ordinary flat commercial carbon between them and adapted to lie opposite the inner and outer faces thereof leaving the side edges thereof exposed, a suitable uniting member for said arms located at one of the ends of said arms, a clamping-plate and a screw tapped through one of said arms and bearing against said plate, whereby the carbon is clamped in the clip.

3. In a carbon-holder for dynamo-electric machines and the like, a clip for clamping the end of the carbon, said clip comprising members adapted to bear on the inner and outer faces of the carbon but leaving the side edges exposed, one of said members being adjustable with reference to the other to accommodate carbons of various thicknesses.

4. In a carbon-holder for dynamo-electric machines and the like, a clip for clamping the end of the carbon, said clip comprising plates adapted to bear on the inner and outer faces of the carbon but leaving the side edges thereof exposed, said plates being provided with right-angled overlapping portions, and screw-and-slot connections uniting the same, whereby the clip can be adjusted to accommodate carbons of various thicknesses.

5. In a carbon-holder for dynamo-electric machines and the like, the combination with a carbon, a shunt-conductor comprising a flat flexible laminated conductor having direct contact with the face of said carbon, and means for holding the same in contact with the carbon.

6. In a carbon-holder for dynamo-electric machines and the like, a clip for clamping the end of the carbon, said clip comprising members adapted to bear on the inner and outer faces of the carbon but leaving the side edges thereof exposed, and a flat flexible shunt-conductor having direct contact with one of the faces of the carbon and being clamped between said carbon and one of the members of said clip.

7. In a carbon-holder for dynamo-electric machines and the like, a shunt-conductor comprising a flexible flat laminated conductor, the said laminæ being separated and having contact on several of the faces of the carbon, and means for holding said laminæ in contact with the carbon.

8. In a carbon-holder for dynamo-electric machines and the like, the combination with a carbon-clip, of a flexible flat laminated shunt-conductor entering said clip and having the laminæ separated, some bearing against the top and inner face of the carbon and others against the outer face of the carbon.

9. In a carbon-holder for dynamo-electric machines and the like, the combination with a carbon, of a support in which it is slidably mounted, a lever pivoted to said support and having a sliding contact against the end of the carbon at two points, and a spring acting on said lever, the arrangement being such that as the lever swings on its pivot under the action of the spring the arm of the lever on which the spring acts increases in effective length to compensate for loss of power of the spring.

10. In a carbon-holder for dynamo-electric machines and the like, the combination with a carbon-clip, of a support in which it is slidably mounted, a flexible shunt-conductor connected to said clip, a pivoted lever having a slidable bearing on the outer end of said clip, and a spring acting on said lever, the arrangement being such that as the lever is thrown back the spring will pass the pivot of the lever and hold the latter inoperative.

11. In a carbon-holder for dynamo-electric machines and the like, the combination with said holder, of a clip or bracket having a socket or opening adapted to pass over the supporting stud or rod, said holder and said clip being provided with plain contacting surfaces, and means for connecting the clip or bracket to the holder in either of two positions.

12. In a carbon-holder for dynamo-electric machines and the like, the combination with such holder, of a clip or bracket having a socket whereby it is pivoted on a supporting rod or stud, said holder being provided with an undercut open slot, a nut adapted to slide in said slot, and a bolt passing through the clip or bracket and entering said nut, whereby the clip or bracket may be secured in reverse positions to the holder.

13. In a carbon-holder for dynamo-electric machines, of a clip or bracket having a socket whereby it is pivoted to a supporting stud or rod, said holder and said clip being provided with plain contact-faces, said holder being provided with an undercut open slot, a nut adapted to slide in said slot, and a bolt passing through the clip or bracket in an inclined direction and entering said nut, so that said nut will lie substantially in a line radial to the socket in the clip and at right angles to the contacting faces between the clip and bracket.

14. In a carbon-holder for dynamo-electric machines and the like, the combination with a holder, of a clip or bracket provided with a slit socket whereby it may be clamped to a supporting stud or rod, said holder being provided with an undercut open slot, a nut adapted to slide in said slot, and a bolt passing through said clip and entering said nut and serving to clamp the clip on the stud or rod and secure the same to the holder in either of two positions.

In testimony whereof we, the said CHARLES ZABEL, BRUNO ZABEL, and WILLIAM ZABEL, have hereunto set our names.

CHARLES ZABEL.
BRUNO ZABEL.
WILLIAM ZABEL.

Witnesses:
ROBERT C. TOTTEN,
F. W. WINTER.